(12) United States Patent
Shibai et al.

(10) Patent No.: US 7,030,177 B2
(45) Date of Patent: Apr. 18, 2006

(54) POWDER DISPERSANT FOR HYDRAULIC COMPOSITIONS

(75) Inventors: Daisuke Shibai, Wakayama (JP); Kyoichi Shirota, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 10/829,296

(22) Filed: Apr. 22, 2004

(65) Prior Publication Data

US 2004/0242760 A1    Dec. 2, 2004

Related U.S. Application Data

(62) Division of application No. 09/994,651, filed on Nov. 28, 2001, now abandoned.

(30) Foreign Application Priority Data

| Nov. 28, 2000 | (JP) | ............... 2000-361125 |
| Nov. 28, 2000 | (JP) | ............... 2000-361126 |

(51) Int. Cl.
  *C08K 3/00*    (2006.01)
(52) U.S. Cl. ............. 524/5; 524/26; 524/523; 526/318.42
(58) Field of Classification Search ........ 524/5, 524/523, 26; 526/318.42
  See application file for complete search history.

(56) References Cited

U.S. PATENT DOCUMENTS 6,437,027 B1    8/2002  Isomura et al.

FOREIGN PATENT DOCUMENTS

| EP | 1 052 232 A1 | 11/2000 |
| JP | 2669761 B | 7/1997 |
| JP | 9-309756 A | 12/1997 |
| JP | 09-328345 A | 12/1997 |
| JP | 09309756 | 12/1997 |
| JP | 11-071154 A | 3/1999 |
| JP | 41-1157897 A | 7/1999 |
| JP | 11-292601 A | 10/1999 |
| JP | 11-310444 A | 11/1999 |
| JP | 2000-26145 A | 1/2000 |
| JP | 2000-26146 A | 1/2000 |
| JP | 2000-044309 A | 2/2000 |
| JP | 2000-086315 A | 3/2000 |
| JP | 2000-0103660 A | 4/2000 |
| JP | 2000-327384 A | 11/2000 |
| JP | 2001-302305 A | 10/2001 |

*Primary Examiner*—Bernard Lipman
(74) *Attorney, Agent, or Firm*—Birch, Stewart, Kolasch & Birch, LLP

(57) ABSTRACT

The present invention provides a powdery dispersant for hydraulic compositions, which is excellent in pumping before drying and in pressure resistance and humidity resistance, which comprises one or more copolymers obtained by polymerizing a specific vinyl monomer (1) such as an ethylenically unsaturated carboxylic acid derivative having a polyoxyalkylene group with a specific vinyl monomer (b) such as (meth)acrylic acid etc., wherein the average number of $C_{2-4}$ oxyalkylene groups or oxystyrene groups added is 45 to 150, $(a)/[(a)+(b)] \times 100$ ranges from 15 to 45 (mol-%), and at least a part of the copolymers are monovalent or polyvalent metal salts.

14 Claims, No Drawings

POWDER DISPERSANT FOR HYDRAULIC COMPOSITIONS

CROSS-REFERENCE TO RELATED APPLICATIONS

This application is a 37 C.F.R. § 1.53(b) divisional of U.S. application Ser. No. 09/994,651, filed Nov. 28, 2001, which in turn claims priority to Japanese Application Nos. 2000-361125 and 2000-361126, both filed on Nov. 28, 2000. The entire contents of each of these applications is hereby incorporated by reference.

BACKGROUND OF THE INVENTION

1. Field of the Invention

The present invention relates to a powdery dispersant for hydraulic compounds such as cement, gypsum etc., particularly for use in grout mortar and to a hydraulic composition comprising the same.

2. Description of the Prior Art

As a dispersant for hydraulic compounds, a monovalent metal salt of a polycarboxylic acid-based copolymer has been used usually as a liquid product because of its high dispersibility. For further improvement of convenience, the metal salt is formed into a powdery dispersant, and a product comprising this powdery dispersant premixed with powdery materials such as hydraulic compounds, aggregate etc. has been developed.

However, there are cases where the monovalent metal salt of a polycarboxylic acid-based copolymer is hardly dry-powdered at room temperature, or even if it can be dry-powdered, the long-term shelf stability thereof prior to use, that is, the absence of adhesion (pressure resistance) attributable to the pressure in a package and the absence of adhesion and deterioration in dispersibility (humidity resistance) attributable to moisture absorption, is not satisfied in high levels.

As the method of obtaining a powdery dispersant, JP-B 2669761 (JP-A 6-239652) discloses a method of spray-drying a liquid polycarboxylic acid-based copolymer and inorganic powder, JP-A 9-309756 discloses a method of converting a copolymer consisting of a polyalkylene glycol alkenyl ether having a few alkylene oxide molecules added thereto and maleic anhydride into a polyvalent metal salt, JP-A 11-310444 discloses a method of using a water-soluble vinyl copolymer in combination with a water-sparingly-soluble, specific metal salt or metal hydroxide, and JP-A 2000-26145 discloses a method of dry-powdering a (meth) acrylate-based cement dispersant having a specific structure wherein the average number of alkylene oxide molecules added is 20 to 109.

When a powdery dispersant is used in a large amount in large scale in a factory in an environment where the temperature and humidity are not necessarily regulated, there is demand for a powdery dispersant with further improvements in pressure resistance and humidity resistance. On the other hand, there is also demand for a powdery dispersant with dispersion performance which is particularly capable of dispersing mortar in a hydraulic composition without conferring excessive viscosity on the mortar, particularly for use in a large amount of powder (particularly for use in grout mortar) which should be endowed with suitable viscosity and dispersed on the spot. In the prior techniques, however, a means of mixing an inorganic powder not contributing to dispersion of hydraulic compounds or a means of incorporating a large amount of salts is adopted, so there are worries about reduction in the efficiency of dispersion by the powdery dispersant or the deterioration of physical properties which may be caused by the powdery dispersant after hardening of the dispersant system.

The powdery dispersant is required to have the long-term shelf stability thereof prior to use, that is, the absence of adhesion (pressure resistance) attributable to the pressure in a package and the absence of adhesion and deterioration in dispersibility (humidity resistance) attributable to moisture absorption, but the conventional powdery dispersants, particularly comprising a monovalent metal salt of polycarboxylic acid-based copolymer, are still poor in pressure resistance and humidity resistance. Further, when dry powdering is conducted industrially, it is important that the viscosity of an aqueous solution of starting materials is not increased to such an extent as not to hinder pumping, etc., and further when the powdery dispersant is used in grout mortar, the resulting hydraulic composition just after kneading is required to have high flowability and suitable separation resistance, but the conventional dispersants are still not satisfactory for these requirements.

SUMMARY OF THE INVENTION

The object of the present invention is to provide a powdery dispersant which is excellent in pressure resistance and humidity resistance without hindering pumping etc., even if a polycarboxylic acid copolymer hardly dry-powdered at room temperature is industrially dry-powdered, and which can confer stable dispersibility on a hydraulic composition, in particular on a hydraulic composition for mortar grout.

The present invention relates to a powdery dispersant for hydraulic compositions. The powdery dispersant encompasses dispersants (I) and (II).

The dispersant (I) is a powdery dispersant for a hydraulic composition, which comprises at least one copolymer obtainable by polymerizing at least one vinyl monomer (a) represented by the formula (1):

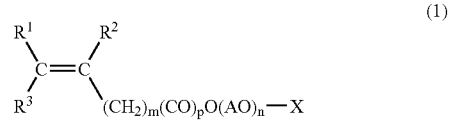

wherein $R^1$ and $R^2$ represent a hydrogen atom or a methyl group, $R^3$ represents a hydrogen atom or $-COO(AO)_nX$, m is a number of 0 to 2, p is a number of 0 or 1, AO represents a $C_{2-4}$ oxyalkylene group or an oxystyrene group, n is the average mole number of added groups and is a number of 2 to 300 and X represents a hydrogen atom or a $C_{1-18}$ alkyl group;

with at least one vinyl monomer (b) represented by the formula (2):

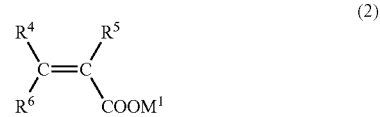

wherein $R^4$, $R^5$ and $R^6$ are the same as or different from one another and each represent a hydrogen atom, a methyl group or —$(CH_2)_{m1}COOM^2$ in which —$(CH_2)_{m1}COOM^2$ may be combined with —$COOM^1$ or another —$(CH_2)_{m1}COOM^2$ to produce an anhydride, $M^1$ and $M^2$ of these groups not being present, $M^1$ and $M^2$ represent a hydrogen atom or a polyvalent metal and $m_1$ is a number of 0 to 2, in which the average mole number of $C_{2-4}$ oxyalkylene groups or oxystyrene groups added to the dispersant molecule is 45 to 150, the ratio of monomer (a) to monomer (b) ranges in (a)/[(a)+(b)]×100 of 15 to 45 (mole-%) and at least part of the copolymers is a polyvalent metal salt.

In the dispersant (I), the ratio of the monomer (a) to the sum total of (a)+(b) ranges preferably in (a)/[(a)+(b)]×100 of 20 to 35 mole %. Further, all the copolymers are preferably polyvalent metal salts.

The dispersant (II) is a powdery dispersant for a hydraulic composition, which comprises at least one copolymer obtainable by polymerizing at least one vinyl monomer (a) represented by the formula (1):

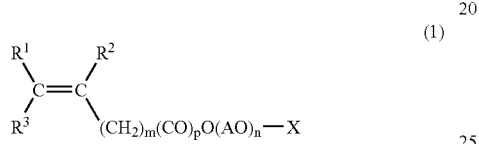

(1)

wherein $R^1$ and $R^2$ represent a hydrogen atom or a methyl group, $R^3$ represents a hydrogen atom or —$COO(AO)_nX$, m is a number of 0 to 2, p is a number of 0 or 1, AO represents a $C_{2-4}$ oxyalkylene group or an oxystyrene group, n is the average mole number of added groups and is a number of 2 to 300 and X represents a hydrogen atom or a $C_{1-18}$ alkyl group;

with at least one vinyl monomer (b) represented by the formula (2):

(2)

wherein $R^4$, $R^5$ and $R^6$ are the same as or different from one another and each represent a hydrogen atom, a methyl group or —$(CH_2)_{m1}COOM^2$ in which —$(CH_2)_{m1}COOM^2$ may be combined with —$COOM^1$ or another —$(CH_2)_{m1}COOM^2$ to produce an anhydride, $M^1$ and $M^2$ of these groups not being present, $M^1$ and $M^2$ represent a hydrogen atom or a monovalent metal and ml is a number of 0 to 2, in which the average mole number of $C_{2-4}$ oxyalkylene groups or oxystyrene groups added to the dispersant molecule is 50 to 150, (a)/[(a)+(b)]×100 ranges from 15 to 45 (mole %) and at least part of the copolymer is a monovalent metal salt.

In the dispersant (II), (a)/[(a)+(b)]×100 ranges from 20 to 45 mole %.

In the dispersant of the present invention, the average mole number of $C_{2-4}$ oxyalkylene groups or oxystyrene groups added is 60 to 130 or 60 to 115. Preferably, the powdery dispersant comprises a copolymer obtained from starting monomers containing 98 to 100% by weight of the monomers (a) and (b), or comprises 50 to 100% by weight of dispersant particles whose diameter is 500 μm or less.

The present invention also provides a hydraulic composition comprising the above-described powdery dispersant and a hydraulic composition, use of the above-described powdery dispersant as a dispersant for a hydraulic composition and a method of dispersing a hydraulic composition by the above-described powdery dispersant.

The powdery dispersant of the present invention comprises at least one copolymer obtained by polymerizing at least one vinyl monomer (a) represented by the formula (1) with at least one vinyl monomer (b) represented by the formula (2), wherein (a)/[(a)+(b)]×100 ranges from 15 to 45 (mole-%), at least part of the copolymer is a monovalent salt or a polyvalent metal salt and the average mole number of $C_{2-4}$ oxyalkylene groups or oxystyrene groups added is 45 to 150 when at least part of the copolymer is a polyvalent metal salt or 50 to 150 when at least part of the copolymer is a monovalent metal salt.

The polyvalent metal salt is preferably divalent. When the copolymer is a monovalent metal salt in part, the number of AO may range peferably from 80 to 150.

DETAILED DESCRIPTION OF THE INVENTION

First, with respect to the dispersant (I), the present inventors focused their attention on the fact that a polyvalent metal salt of a polycarboxylic acid-based dispersant is easily dry-powdered without lowering dispersibility, and they attempted to determine the most suitable structure of the polycarboxylic acid-based dispersant for bringing about pressure resistance and humidity resistance in good balance. As a result, the present inventors found that the added mole number of $C_{2-4}$ oxyalkylene groups or oxystyrene groups (referred to hereinafter as specific AO groups) present in the dispersant and the copolymer molar ratio $M_a$ (mole-%) of the monomer (a) in the dispersant are significantly involved in giving rise to pressure resistance and humidity resistance. That is, pressure resistance tends to improve as the number of specific AO groups added is increased and $M_a$ is decreased, while humidity resistance tends to improve as the number of specific AO groups added is increased and $M_a$ is increased. Then, the average number $n_M$ of specific AO groups added in the dispersant was defined as 45 to 150, and $M_a$ as 15 to 45 mole-%, and in these ranges, pressure resistance and humidity resistance were achieved in good balance. In the dispersant satisfying this definition, the present inventors further defined use of a polyvalent metal salt of said copolymer in order to achieve good dry powdering and good dispersibility.

Further, with respect to the dispersant (II), the present inventors determined that the average number $n_M$ of specific AO groups added in the dispersant is in the range of 50 to 150, and $M_a$ is 15 to 45 (mole-%), and in these ranges, pressure resistance and humidity resistance were achieved in good balance. In the dispersant satisfying this definition, the present inventors further defined use of a monovalent metal salt of said copolymer in order to achieve good dispersibility. Hereinafter, the monomers (a) and (b), the copolymers etc. are described.

[Monomer (A)]

The monomer (A) represented by formula (1) includes (half) esterified products of a polyalkylene glycol terminated by an alkyl group, such as methoxypolyethylene glycol, methoxypolypropylene glycol, methoxypolybutylene glycol, methoxypolystyrene glycol and ethoxypolyethylene polypropylene glycol with (meth)acrylic acid or maleic acid; etherified products thereof with 3-methyl-3-butenyl alcohol or (meth)allyl alcohol; or adducts having ethylene oxide or propylene oxide added to (meth)acrylic acid, maleic acid, 3-methyl-3-butenyl alcohol or (meth)allyl alcohol. $R_3$ is preferably a hydrogen atom, p is preferably 1, and m is preferably 0. AO is preferably an oxyethylene group. The monomer (a) is preferably an esterified product of alkoxy, particularly methoxypolyethylene glycol with (meth)acrylic acid. Two or more monomers (a) different in "n" may be used as a mixture thereof. n is preferably 5 to 200, more preferably 8 to 150.

<Monomer (b)>

The monomer (b) represented by formula (2) is preferably a monocarboxylic acid monomer such as (meth)acrylic acid, crotonic acid etc., a dicarboxylic acid monomer such as maleic acid, itaconic acid, fumaric acid etc., or an anhydride thereof or a polyvalent metal salt thereof, for example an alkaline earth metal salt, more preferably (meth)acrylic acid or a polyvalent salt thereof, maleic acid or a polyvalent metal salt thereof and maleic anhydride, more preferably (meth)acrylic acid or an alkaline earth metal salt thereof, and most preferably (meth)acrylic acid.

Further, the monomer (b) may also be a monovalent metal salt such as alkali metal salt, more preferably (meth) acrylic acid, maleic acid, maleic anhydride and most preferably (meth)acryl acid or an alkali metal salt thereof such as sodium salt, potassium salt etc.

<Copolymer>

The copolymers used in the powdery dispersant of the present invention can be produced in a known method by using the monomers (a) and (b). A plurality of monomers (a) and (b) can be used. Examples of methods for producing the same include solution polymerization methods exemplified in Japanese Patent Application Laid-Open No. 59-162163, Japanese Patent Application Laid-Open No. 62-70250, Japanese Patent Application Laid-Open No. 62-78137 and U.S. Pat. Nos. 4,870,120 and 5,137,945. That is, the copolymers can be produced by polymerizing the vinyl monomers (a) and (b) in the ratio defined above in a suitable solvent. For example, the monomers may be reacted at 50 to 100° C. for 0.5 to 10 hours in a nitrogen atmosphere in water or $C_{1-4}$ lower alcohol in the presence of a polymerization initiator such as ammonium persulfate, hydrogen peroxide etc. and if necessary in the presence of sodium hydrogen sulfite, mercaptoethanol etc.

For production of the copolymers of the present invention, copolymerizable monomers such as acrylonitrile, (meth)acrylamide, styrene, alkyl (meth)acrylates ($C_{1-12}$ acrylates which may have a hydroxyl group), methallyl sulfonic acid, styrene sulfonic acid, phosphoethyl methacrylate and sulfoethyl methacrylate can be used in combination with the monomers (a) and (b), but the starting monomers comprise preferably 98 to 100% by weight of the monomers (a) and (b).

The weight average molecular weight of the copolymers used in the powdery dispersant of the present invention (determined using polyethylene glycol standards in gel permeation chromatography with columns G4000 PWXL+ G2500 PWXL (Tosoh Corp.) and eluent 0.2 M phosphate buffer/acetonitrile=7/3 (ratio by volume)] is preferably in the range of 6,000 to 1,000,000, more preferably 10,000 to 200,000 and most preferably 55,000 to 150,000 from the viewpoint of dispersibility and surface hardness.

At least part of the copolymer of the present invention forms a monovalent or polyvalent metal salt. The salts may be derived from monomers or formed through neutralization after copolymerization reaction.

The polyvalent metal includes calcium, magnesium, aluminum etc., and calcium is particularly preferable. In consideration of dry-powdering, the degree of polymerization with polyvalent metals is preferably 5% or more, more preferably 10% or more, more preferably 20% or more, more preferably 40% or more and most preferably 50% or more. If the degree of polymerization is too high, the resulting copolymers are poor in pumping because of excessive thickening, so the degree of polymerization is preferably 100% or less, more preferably 90% or less. This degree of neutralization is the ratio of the number of moles of total charged polyvalent metal salts to the number of moles of total carboxyl groups in the powdery dispersant, and can be calculated by quantifying the polyvalent metal salts in the powdery dispersant by induction binding plasma emission analysis.

The monovalent metal is preferably an alkali metal, more preferably sodium. The degree of neutralization is preferably 40 to 100%, more preferably 50 to 90% and most preferably 50 to 80%.

In the powdery dispersant of the present invention, a plurality of copolymers different in $n_M$ and $M_a$ can be used. If necessary, acid-form copolymers which are not polyvalent metal salts can also be used in combination.

<Powdery Dispersant>

The resulting copolymers can be used as the dispersant after being powdered in a usual manner. Specifically, a spray drying method, a film drying method etc. can be mentioned. At the time of production, the copolymers can be powdered if necessary together with organic and/or inorganic compounds as carriers, but these carriers are preferably not used. The organic compounds are preferably high-molecular compounds, and the inorganic compounds are preferably blast furnace slag, siliceous sand, silica powder, fly ash and calcium carbonate. When carriers are used, the amount thereof in the finally obtained powdery dispersant is preferably 1 to 80% by weight, particularly 5 to 30% by weight.

When the monomer (a) where n is 110 or more is used in the dispersant (II), it is preferable that a sticky film of the polycarboxylic acid copolymers is formed on a support, and the film is powdered by reducing the viscosity of the film. At the time of production, the copolymers can be powdered if necessary together with organic and/or inorganic compounds as carriers, but these carriers are preferably not used. The organic compounds are preferably high-molecular compounds, and the inorganic compounds are preferably blast furnace slag, siliceous sand, silica powder, fly ash and calcium carbonate. When carriers are used, the amount thereof in the finally obtained powdery dispersant is preferably 1 to 80% by weight, particularly 5 to 30% by weight.

In the powdery dispersant (I) of the present invention, the average number $n_m$ of specific AO molecules added is 45 to 150, and for pressure resistance and humidity resistance, the $n_M$ is 50 or more, preferably 60 or more and most preferably 70 or more. For suppressing thickening of mortar and for pumping during production of the copolymers, the $n_m$ is 150 or less, preferably 130 or less, more preferably 115 or less and most preferably 100 or less.

In the powdery dispersant (II) of the present invention, the average number $n_m$ of specific AO molecules added is 50 to 150, and for pressure resistance and humidity resistance, the $n_m$ is 60 or more, preferably 70 or more, more preferably 75 or more and most preferably 80 or more. For pressure resistance and pumping during production of the copolymers, the $n_m$ is 130 or less, preferably 115 or less and more preferably 100 or less.

The average number $n_M$ of specific AO molecules added may be adjusted by being mixed with another AO—including compound.

In the powdery dispersant (I) of the present invention, it is preferable for humidity resistance that the ratio $M_a$, that is, the total monomer (a) to the sum total of the monomers (a)+(b) is selected such that (a)/[(a)+(b)]×100 may be in the range of 15 to 45 mole-%. For pressure resistance, the $M_a$ is preferably 40 mole-% or less. In the powdery dispersant (I), the ratio of the total monomer (a) to the sum total of the monomers (a)+(b), (a)/[(a)+(b)]×100, may be in the range of 20 to 35 mole-%.

In the powdery dispersant (II), the ratio $M_a$ of the total monomer (a) to the sum total of the monomers (a)+(b) may be selected such that (a)/[(a)+(b)]×100 is in the range of 15 to 45 mole-%, preferably 20 mole-% or more for powder drying and humidity resistance. For pressure resistance, the $M_a$ is preferably 45 mole-% or less.

The $n_M$ and $M_a$ can also be calculated from the ratio of charged monomers (a) to (b) or determined by analyzing the final dispersant in $^1$H-NMR. In the present invention, the $n_M$ and $M_a$ of the dispersant were determined by analysis in $^1$H-NMR.

In molecular design where two or more monomers different in "n" are used as the monomer (a), the $n_M$ can be approximately estimated from the ratio of Σ [mole-% of the monomer (a) of number j of added AO molecules×number j of added AO molecules to Σ [mole-% of the monomer (a) of number j of added AO molecules].

In the present invention, monovalent metal salts (preferably sodium salts) of the copolymers obtainable by polymerizing at least one vinyl monomer (a) with at least one vinyl monomer (b) can be used in combination. Some copolymers (acid form) consisting of the monomers (a) and (b) or some monovalent metal salts thereof are hardly dry-powdered at room temperature, but dry-powdering can be improved by simultaneously using copolymers which are polyvalent metal salts at least partially, preferably entirely. The average value $n_{MP}$ of n of the total monomers (a) constituting the polyvalent metal salts is preferably greater than the average value $n_{MP}$ of n of the total monomers (a) in the copolymers (acid form) and/or monovalent metal salts thereof (that is, $n_{MP}>n_{MM}$) more preferably greater by 1 or more, further preferably by 2 or more and most preferably by 5 or more.

To allow the polyvalent metal salt-type copolymers to be present in the powdery dispersant of the present invention, the monovalent metal salt-type copolymers may previously be mixed with the polyvalent metal salt-type copolymers and then dry-powdered, or the monovalent metal salt-type copolymers having low degrees of neutralization may be converted into copolymers containing polyvalent metal salts by neutralization with a polyvalent metal hydroxide, and insofar as the polyvalent metal salt-type copolymers are finally contained in the powdery dispersant, any method can be used.

From the viewpoint of anti-foaming properties, an anti-foaming agent is desirably added to the powdery dispersant of the present invention. The anti-foaming agent includes those based on lower alcohols such as methanol and ethanol, silicones such as dimethyl silicone oil and fluorosilicone oil, mineral oils such as materials compounded with mineral oils and surfactants, phosphates such as tributyl phosphate, fatty acids or esters thereof, such as oleic acid, sorbitan oleic acid monoester, sorbitan oleic acid monoester, polyethylene glycol fatty ester and polyethylene/polypropylene glycol fatty ester, and nonionic materials such as polypropylene glycol, and polyethylene/polypropylene glycol alkyl ether. The anti-foaming agent is preferably fatty acids or esters thereof, more preferably polyethylene/polypropylene glycol fatty esters. The amount of the anti-foaming agent added to the powdery dispersant is preferably 0.01 to 10% by weight, more preferably 0.05 to 5% by weight and most preferably 0.1 to 3% by weight.

From the viewpoint of water solubility for practical use, the powdery dispersant of the present invention comprises preferably 50 to 100% by weight, more preferably 70 to 100% by weight and most preferably 90 to 100% by weight of the powdery dispersant whose particle diameter is 500 μm or less.

The powdery dispersant of the present invention can be used after being premixed with hydraulic compounds such as cement, gypsum etc. and if necessary with aggregate. The premix can be used in self-leveling materials, grout for tunnels, spraying mortar, shrink-free materials, refractory, gypsum plaster etc. The hydraulic compounds include Portland cement, blast furnace cement, silica cement, fly ash cement, alumina cement, natural gypsum, gypsum byproducts, etc., preferably Portland cement, alumina cement and natural gypsum, more preferably Portland cement and alumina cement.

The powdery dispersant of the present invention is used in an amount of preferably 0.01 to 5% by weight, more preferably 0.02 to 3% by weight in terms of solid content in hydraulic compounds such as cement, gypsum etc.

EXAMPLES

Production Example 1

A glass reaction vessel equipped with a thermometer, a stirrer, a dropping funnel, a nitrogen inlet pipe and a reflux condenser was charged with 475 parts by weight of water, and the atmosphere therein was replaced by nitrogen. Then, the vessel was heated to 58° C. in a nitrogen atmosphere, and 3 solutions, that is, a mixture of 295 parts by weight of methoxy polyethylene glycol monomethacrylate (monomer (a), n=10) and 76.7 parts by weight of methacrylic acid, 44.9 parts by weight of 5% aqueous 2-mercaptoethanol, and 85.2 parts by weight of 5% aqueous ammonium persulfate, were simultaneously added dropwise thereto over 90 minutes. Then, the mixture was aged at the same temperature for 1 hour, and then 13.1 parts by weight of 5% aqueous ammonium persulfate was added dropwise thereto over 30 minutes and thereafter aged at the same temperature for 2 hours. The reaction solution was neutralized by adding 52.7 parts by weight of calcium hydroxide and then cooled to give a copolymer having a weight average molecular weight of 36000 [Ca salt (degree of neutralization of 80%)] (copolymer 2 in Table 1). The other similar copolymer Ca salts having degrees of neutralization of 80±10%, shown in Table 1, were produced in an analogous manner.

Production Example 2

The same glass reaction vessel as in Production Example 1 was charged with 266 parts by weight of water, and the atmosphere therein was replaced by nitrogen. Then, the vessel was heated to 80° C. in a nitrogen atmosphere, and 3 solutions, that is, a mixture of 508.5 parts by weight of 60% methoxy polyethylene glycol monomethacrylate (monomer (a), n=120), 42.2 parts by weight of methoxy polyethylene glycol monomethacrylate (monomer (a), n=9) and 36.6 parts by weight of methacrylic acid, 44.3 parts by weight of 5% aqueous 2-mercaptoethanol, and 51.7 parts by weight of 5% aqueous ammonium persulfate, were simultaneously added dropwise thereto over 90 minutes. Then, the mixture was aged at the same temperature for 1 hour, and then 25.8 parts by weight of 5% aqueous ammonium persulfate was added dropwise thereto over 30 minutes and thereafter aged at the same temperature for 2 hours. The reaction solution was neutralized by adding 25.2 parts by weight of calcium hydroxide and then cooled to give a copolymer having a weight average molecular weight of 68000 [Ca salt (degree of neutralization of 80%)] (copolymer 17 in Table 1). The other similar copolymer Ca salts having degrees of neutralization of 80±10%, shown in Table 1, were produced in an analogous manner.

Production Example 3

Copolymer 8 [Ca salt (degree of neutralization of 80%)] in Table 1 was produced in the same manner as in the method of producing a water-soluble vinyl copolymer described in Japanese Patent Application Laid-Open No. 7-309656 except that calcium hydroxide was used in place of sodium hydroxide.

Production Example 4

Copolymer 22 [Ca salt (degree of neutralization of 80%)] in Table 1 was produced in the same manner as in the production method described in column 0042 in Japanese Patent Application Laid-Open No. 9-309756.

Production Example 5

A glass reaction vessel equipped with a thermometer, a stirrer, a dropping funnel, a nitrogen inlet pipe and a reflux condenser was charged with 202.2 parts by weight of water, and the atmosphere therein was replaced by nitrogen. Then, the vessel was heated to 80° C. in a nitrogen atmosphere, and 3 solutions, that is, a mixture of 570.7 parts by weight of 60% methoxy polyethylene glycol monomethacrylate (monomer (a), n=75) and 34.7 parts by weight of methacrylic acid, 62.9 parts by weight of 5% aqueous 2-mercaptoethanol, and 68.8 parts by weight of 5% aqueous ammonium persulfate, were added simultaneously added dropwise thereto over 90 minutes. Then, the mixture was aged at the same temperature for 1 hour, and then 23 parts by weight of 5% aqueous ammonium persulfate was added dropwise thereto for 30 minutes and thereafter aged at the same temperature for 2 hours. The reaction solution was neutralized by adding 23.5 parts by weight of 48% aqueous sodium hydroxide, and then 7.8 parts by weight of 35% aqueous hydrogen peroxide was added thereto and the mixture was heated to 90° C., kept at the same temperature for 1 hour, and cooled to give a copolymer having a weight average molecular weight of 33000 [Na salt (degree of neutralization of 70%)] (Invented Product 4 in Table 4). The other similar copolymers having degrees of neutralization of 70±10%, shown in Table 4, were produced in an analogous manner.

TABLE 1

| | | Monomer(a) | | | | | Monomer(b) | | Others | | | | | |
| | | (a)-1 | | | (a)-2 | | | | | | | | | |
| | Type | Charge molar ratio | n | Type | Charge molar ratio | n | Type | Charge molar ratio | Type | Charge molar ratio | Weight-% (a) + (b) | Salt | Mw | Production Example |
|---|---|---|---|---|---|---|---|---|---|---|---|---|---|---|
| Copolymer No. 1 | MEPEG | 38 | 10 | — | — | — | MAA | 62 | — | — | 100 | Na Salt | 36000 | 1 |
| 2 | MEPEG | 38 | 10 | — | — | — | MAA | 62 | — | — | 100 | Ca Salt | 36000 | |
| 3 | MEPEG | 33 | 25 | — | — | — | MAA | 67 | — | — | 100 | Na Salt | 46000 | |
| 4 | MEPEG | 33 | 25 | — | — | — | MAA | 67 | — | — | 100 | Ca Salt | 46000 | |
| 5 | MEPEG | 30 | 60 | — | — | — | MAA | 70 | — | — | 100 | Na Salt | 21000 | |
| 6 | MEPEG | 30 | 60 | — | — | — | MAA | 70 | — | — | 100 | Ca Salt | 21000 | |
| 7 | MEPEG | 20 | 50 | — | — | — | MAA | 75 | MSA | 5 | 98.8 | Ca Salt | 61000 | 3 |
| 8 | MEPEG | 20 | 50 | — | — | — | MAA | 65 | MSA | 15 | 96.4 | Ca Salt | 53000 | |
| 9 | MEPEG | 30 | 90 | — | — | — | MAA | 70 | — | — | 100 | Na Salt | 41000 | 1 |
| 10 | MEPEG | 30 | 90 | — | — | — | MAA | 70 | — | — | 100 | Ca Salt | 41000 | |
| 11 | MEPEG | 30 | 100 | — | — | — | MAA | 70 | — | — | 100 | Ca Salt | 63000 | |
| 12 | MEPEG | 20 | 120 | — | — | — | MAA | 80 | — | — | 100 | Na Salt | 66000 | |
| 13 | MEPEG | 20 | 120 | — | — | — | MAA | 80 | — | — | 100 | Ca Salt | 66000 | |
| 14 | MEPEG | 35 | 120 | — | — | — | MAA | 65 | — | — | 100 | Ca Salt | 72000 | |
| 15 | MEPEG | 15 | 140 | — | — | — | MAA | 85 | — | — | 100 | Ca Salt | 59000 | |
| 16 | MEPEG | 15 | 160 | — | — | — | MAA | 85 | — | — | 100 | Ca Salt | 89000 | |
| 17 | MEPEG | 10 | 120 | MEPEG | 15 | 9 | MAA | 75 | — | — | 100 | Ca Salt | 68000 | 2 |
| 18 | MEPEG | 15 | 90 | MEPEG | 15 | 25 | MAA | 70 | — | — | 100 | Ca Salt | 64000 | |
| 19 | MEPEG | 10 | 90 | MEPEG | 15 | 60 | MAA | 75 | — | — | 100 | Ca Salt | 61000 | |
| 20 | MEPEG | 55 | 120 | — | — | — | MAA | 45 | — | — | 100 | Ca Salt | 82000 | 1 |
| 21 | MEPEG | 45 | 60 | — | — | — | MAA | 55 | — | — | 100 | Ca Salt | 45000 | |
| 22 | METPEG | 30 | 70 | — | — | — | MA | 70 | — | — | 100 | Ca Salt | 59000 | 4 |

(Note)
The meanings of the symbols in the table are as follows. The degree of neutralization of any copolymer salts in the table is 80 ± 10%.
MEPEG: methoxy polyethylene glycol monomethacrylate
METPEG: methoxy polyethylene glycol monoallyl ether
MAA: methacrylic acid
MSA: methallyl sulfonic acid
MA: maleic anhydride
Mw: weight average molecular weight

Production Example 6

The same glass reaction vessel as in Production Example 5 was charged with 248.5 parts by weight of water, and the atmosphere therein was replaced by nitrogen. Then, the vessel was heated to 80° C. in a nitrogen atmosphere, and 3 solutions, that is, a mixture of 502.2 parts by weight of 60% methoxy polyethylene glycol monomethacrylate (monomer (a), n=120), 41.5 parts by weight of methoxy polyethylene glycol monomethacrylate (monomer (a), n=9) and 36 parts by weight of methacrylic acid, 39.2 parts by weight of 5% aqueous 2-mercaptoethanol, and 76.2 parts by weight of 5% aqueous ammonium persulfate, were simultaneously added dropwise thereto over 90 minutes. Then, the mixture was aged at the same temperature for 1 hour, and then 20.3 parts by weight of 5% aqueous ammonium persulfate were added dropwise thereto over 30 minutes and thereafter aged at the same temperature for 2 hours. The reaction solution was neutralized by adding 24.4 parts by weight of 48% aqueous sodium hydroxide, and then 5 parts by weight of 35% aqueous hydrogen peroxide was added thereto. The mixture was heated to 90° C., kept at the same temperature for 1 hour, and cooled to give a copolymer having a weight average molecular weight of 68000 [Na salt (degree of neutralization of 70%)] (Invented Product 15 in Table 4). The other similar copolymers having degrees of neutralization of 70±10%, shown in Table 4, were produced in an analogous manner.

Production Example 7

A copolymer [Na salt (degree of neutralization of 70%)] as Comparative Product 5 in Table 4 was produced in the same manner as in the method of producing a water-soluble vinyl copolymer described in Japanese Patent Application Laid-Open No. 7-309656.

Production Example 8

A copolymer [Na salt (degree of neutralization of 70%)] as Invented Product 18 in Table 4 was produced in the same manner as in the production method described in column 0042 in Japanese Patent Application Laid-Open No. 9-309756 except that sodium hydroxide was added in place of calcium hydroxide.

Example 1

The copolymers shown in Table 1 were combined as shown in Table 2 to prepare dispersants which were then evaluated in the following manner. The results are shown in Table 2. Further, the $n_M$ and $M_a$ of each dispersant were measured in the following methods.

(A) $n_M$ of the Dispersant

The dispersant dissolved in water was dried under reduced pressure in a nitrogen atmosphere, dissolved at a concentration of 3 to 4% in heavy water and measured by $^1$H-NMR. From the integrated area of an alkoxy group (in this case, methoxy group) peak and the integrated area of an alkylene oxide group (in this case, ethylene oxide group) peak, the total number of H atoms in the ethylene oxide group was determined and then divided by the number of hydrogen atoms contained in one ethylene oxide group to give $n_M$ of the dispersant. Measurement by $^1$H-NMR was conducted using "UNITY-INOVA500" (500 MNHz) manufactured by Varian Co., Ltd. under the following conditions: the number of data points, 64000; the measurement range, 10000.0 Hz; the pulse width (45° pulse), 60 μsec.; the pulse delay time, 30 sec.; and the measurement temperature, 25.0° C.

(B) $M_a$ of the Dispersant

The dispersant dissolved in water was dried at room temperature in a nitrogen atmosphere, dissolved in heavy water and measured by $^1$H-NMR (under the same conditions as described above). From an accumulated area (s) of an alkoxy group (in this case, methoxy group) peak and an accumulated area (S) of a main-chain alkyl group (in this case, methyl group) peak, [(S−s)/S]×100 was calculated to determine the ratio $M_a$ of the monomer (a) to the monomer (b) in the entire dispersant.

(1-1) Dry-powdering Properties

An aqueous solution of each dispersant in Table 1, whose concentration and amount were previously regulated so as to form a film of about 1 mm in thickness after drying, was placed in a flat vessel and dried at 105° C. for 2 hours. From the dried dispersant film, a test specimen of 40 mm×15 mm was prepared and put between fingers at a site apart by about 1 cm from one end in the longer direction, and the test specimen was bent by bending force exerted from the other end. This test was conducted at a predetermined film temperature, and the behavior was observed and evaluated in the following criteria. "Capable of powdering" was given to a specimen broken by the bending force, and "Not capable of powdering" was given to a specimen simply bent without breakage. The temperature of the film was regulated by leaving it in a non-hygroscopic state in a thermostatic chamber at a predetermined temperature for 2 hours.

A: Capable of powdering at 40° C.
B: Capable of powdering at 30° C., but liquefying or not capable of powdering at 40° C.
C: Capable of powdering at 20° C., but liquefying or not capable of powdering at 30° C.
D: Capable of powdering at 10° C., but liquefying or not capable of powdering at 20° C.
E: Not capable of powdering at 10° C.
F: Liquefying at 10° C.

(1-2) Pressure Resistance 250 cm$^3$ dispersant was charged into a polyethylene bag (volume: 250 cm$^3$) and, in a sealed state, left at 20° C. with a loading of 1000 kgf/m$^2$. After 1 day and after 7 days, the degree of sifting through a 1410 μm sieve was measured and evaluated for pressure resistance under the following criteria.

A: Degree of sifting of 95% (exclusive) to 100% (inclusive)
B: Degree of sifting of 90% to 95%
C: Degree of sifting of 80% to 90%
D: Degree of sifting of 70% to 80%
E: Degree of sifting of 50% to 70%
F: Degree of sifting of 50% or less (1-3) Humidity Resistance 50 g powdery dispersant (previously dried at 105° C. for 2 hours) was placed in a 300 ml beaker and left for 7 days in an open system in a thermostatic chamber at 25° C. under 40% humidity, and the amount of absorbed water therein was determined from a change in the weight thereof, to evaluate humidity resistance under the following criteria.

A: Water content of 2% or less (solid content: 98% or more)
B: Water content of 2% (exclusive) to 4% (inclusive) (solid content: 96% (inclusive) to 98% (exclusive))
C: Water content of 4% to 6% (solid content: 94% to 96%)
D: Water content of 6% to 8% (solid content: 92% to 94%)
E: Water content of 8% to 10% (solid content: 90% to 92%)
F: Water content of more than 10% (solid content: less than 90%)

(1-4) Pumping (Pump Transportability)

The viscosity of an aqueous solution of the dispersant (active ingredient: 40% by weight) at 20° C. was measured with a Brookfield rotational viscometer, to evaluate pump transportability under the following criteria.
A: Viscosity of 400 mPa.s (inclusive) to 420 mPa.s (exclusive)
B: Viscosity of 420 mPa.s to 450 mPa.s
C: Viscosity of 450 mPa.s to 500 mPas
D: Viscosity of 500 mPa.s to 600 mPa.s
E: Viscosity of 600 mPa.s to 700 mPa.s
F: Viscosity of 700 mPa.s or more (1-5) Separation Resistance The dispersant, 360 g water, 800 g cement and 1800 g fine aggregate were kneaded in a mortar mixer (in accordance with JIS R 5201.8), and the resulting mortar was packed in an inverted conical cylinder (device for measuring the dropping time of the mortar) of 300 mm in length having an upper inlet opening of 100 mm in diameter and a lower discharge opening of 20 mm in diameter in such a state that the lower discharge opening was closed, and then the mortar was cut by rubbing on the face of the upper inlet opening. By opening the lower discharge opening, the mortar was gravitationally dropped to determine the time (dropping time) elapsed until a hole in at least a part of the mortar was recognized by observing the upper inlet opening. A longer dropping time is indicative of higher viscosity of the concrete, thus indicating higher resistance to material separation. The amount of the dispersant added was regulated such that the mortar flow value was 290 mm±10 mm.

As shown in Table 2, the dispersants as Comparative Products 1-1, 1-3 and 1-4 where the $n_M$ is small cannot be dry-powdered, and Comparative Product 2 even containing a polyvalent metal salt is poor in pressure resistance when the $n_M$ is low. Further, Comparative Product 1-5 where the $n_M$ is large is poor in pumping (pump transportability). On the other hand, Invented Products 1-1 to 1-23 are excellent in dry powdering, pressure resistance, humidity resistance, pump transportability and separation resistance.

Example 2

100 parts by weight of rapid-hardening Portland cement (Taiheiyo Cement Corp.), 100 parts by weight of fine aggregate [siliceous sand (a mixture of Nos. 3, 4 and 5, manufactured by Takeori Kogyo-sho)], 0.0025 part by weight of a thickener [Metrose (Shin-Etsu Chemical Co., Ltd.)], 0.02 part by weight of a retarder [sodium citrate (special grade)], 5 parts by weight of an expansive material [Denka CSA (Denki Kagaku Kogyo)], 0.0015 part by weight of a foaming agent (metal aluminum powder), the powdery dispersant in Table 3 and an anti-foaming agent [Foamlex 797 (Nicca Chemical Co., Ltd.)] in an amount shown in Table 3 were mixed to produce a grout material. Water was added to the grout material, and the mixture was kneaded for 3 minutes with a hand mixer to give slurry. This slurry was used in the following evaluation. The results are shown in Table 3.

(2-1) Flowability

TABLE 2

| | | Dispersant | | | | | | | | | Pressure resistance | | Humidity resistance | Pump transportability | Separation resistance (sec) |
|---|---|---|---|---|---|---|---|---|---|---|---|---|---|---|---|
| | | Co-polymer No. | Weight-% | Co-polymer No. | Weight-% | Co-polymer No. | Weight-% | $M_a$ (mol-%) | $n_M$ | Dry powdering | After 1 days | After 7 days | | | |
| Comparative Products | 1-1 | 1 | 100 | — | — | — | — | 37.0 | 9.2 | F | — | — | — | — | — |
| | 1-2 | 2 | 100 | — | — | — | — | 37.6 | 10.2 | E | E | F | E | A | 5.1 |
| | 1-3 | 3 | 100 | — | — | — | — | 34.5 | 24.0 | F | — | — | — | — | — |
| | 1-4 | 1 | 75 | 12 | 25 | — | — | 32.1 | 37.0 | F | — | — | — | — | — |
| | 1-5 | 16 | 100 | — | — | — | — | 15.6 | 159.7 | A | A | A | A | F | 15.9 |
| | 1-6 | 20 | 100 | — | — | — | — | 56.0 | 120.9 | A | A | A | B | F | 17.0 |
| Invented Products | 1-1 | 8 | 100 | — | — | — | — | 20.4 | 50.9 | E | E | E | E | C | 5.9 |
| | 1-2 | 7 | 100 | — | — | — | — | 21.0 | 50.9 | E | D | E | E | C | 5.7 |
| | 1-3 | 1 | 65 | 12 | 25 | 13 | 10 | 30.9 | 47.8 | E | D | E | D | A | 6.0 |
| | 1-4 | 1 | 20 | 21 | 80 | — | — | 42.2 | 48.9 | D | D | E | D | C | 6.1 |
| | 1-5 | 17 | 100 | — | — | — | — | 24.3 | 52.9 | D | D | D | D | C | 6.2 |
| | 1-6 | 18 | 100 | — | — | — | — | 24.6 | 59.1 | D | D | D | D | D | 6.1 |
| | 1-7 | 1 | 60 | 12 | 20 | 13 | 20 | 31.2 | 55.3 | D | D | E | D | A | 6.3 |
| | 1-8 | 6 | 100 | — | — | — | — | 31.0 | 58.7 | C | C | D | C | C | 6.5 |
| | 1-9 | 1 | 50 | 13 | 50 | — | — | 30.1 | 64.3 | B | C | C | C | B | 6.6 |
| | 1-10 | 2 | 50 | 12 | 50 | — | — | 29.4 | 64.6 | B | B | C | B | A | 6.7 |
| | 1-11 | 2 | 50 | 13 | 50 | — | — | 29.5 | 65.9 | B | B | C | B | C | 6.7 |
| | 1-12 | 2 | 25 | 10 | 75 | — | — | 32.6 | 71.0 | A | B | B | B | D | 8.0 |
| | 1-13 | 19 | 100 | — | — | — | — | 24.1 | 71.5 | A | B | B | A | D | 8.3 |
| | 1-14 | 4 | 25 | 10 | 75 | — | — | 29.2 | 72.6 | A | B | B | A | D | 8.7 |
| | 1-15 | 5 | 25 | 10 | 75 | — | — | 31.0 | 81.4 | A | A | B | A | D | 8.3 |
| | 1-16 | 6 | 25 | 10 | 75 | — | — | 31.4 | 81.9 | A | A | A | A | D | 8.2 |
| | 1-17 | 9 | 25 | 10 | 75 | — | — | 30.8 | 89.1 | A | A | A | A | D | 9.5 |
| | 1-18 | 10 | 100 | — | — | — | — | 29.1 | 90.7 | A | A | A | A | D | 9.7 |
| | 1-19 | 11 | 15 | 13 | 85 | — | — | 20.8 | 115.9 | A | A | A | A | D | 8.6 |
| | 1-20 | 13 | 100 | — | — | — | — | 21.1 | 121.3 | A | A | A | A | D | 10.3 |
| | 1-21 | 14 | 100 | — | — | — | — | 34.1 | 119.4 | A | A | A | A | D | 15.5 |
| | 1-22 | 15 | 100 | — | — | — | — | 14.3 | 141.3 | A | A | A | A | E | 14.2 |
| | 1-23 | 22 | 100 | — | — | — | — | 31.0 | 71.0 | A | A | A | A | D | 15.9 |

The dropping time (sec.) was measured by "PC Grout Test Method (JCSE-F531)" according to Japanese Society of Civil Engineering. However, the amount of the powdery dispersant added was regulated such that the flow value measured according to "JIS R 5201 Cement Physical Test Method" was 250 mm±10 mm.

(2-2) Bleeding Ratio

Determined by "PC Grout Test Method (Polyethylene Bag Method) (JCSE-F532)" according to Japanese Society of Civil Engineering.

(2-3) Expansivity

Determined by "PC Grout Test Method (Vessel Method) (JCSE-F533)" according to Japanese Society of Civil Engineering.

(2-4) Compression Strength

The material aged for 28 days was measured according to "JIS R 5201 Cement Physical Test Method".

TABLE 3

| | Powdery dispersant | | | | | | Dropping time (sec) | | | | | | |
|---|---|---|---|---|---|---|---|---|---|---|---|---|---|
| No. | Copolymer No. | Weight-% | Copolymer No. | Weight-% | Anti-foaming agent | $M_a$ (mole-%) | $n_M$ | Just after kneading | After 30 minutes | After 60 minutes | After 90 minutes | Bleeding ratio (%) | Expansivity (%) | Compression strength (N/mm²) |
| 2-1 | 10 | 100 | — | — | 0.3 | 29.1 | 90.7 | 6.0 | 8.3 | 11.0 | 14.1 | less than 0.5 | +0.84 | 56 |
| 2-2 | 10 | 100 | — | — | — | 29.1 | 90.7 | 5.8 | 8.3 | 11.0 | 13.9 | less than 0.5 | +0.83 | 52 |
| 2-3 | 1 | 50 | 13 | 50 | 0.3 | 30.1 | 65.9 | 5.8 | 8.1 | 10.6 | 13.4 | less than 0.5 | +0.83 | 55 |
| 2-4 | 19 | 100 | — | — | 0.3 | 24.1 | 71.5 | 5.6 | 7.9 | 10.4 | 13.2 | less than 0.5 | +0.84 | 57 |
| 2-5 | 22 | 100 | — | — | 0.3 | 31.0 | 71.0 | 5.1 | 7.2 | 9.8 | 11.5 | less than 0.5 | +0.85 | 53 |
| 2-6 | 16 | 100 | — | — | 0.3 | 15.6 | 160.0 | 7.1 | 10.7 | 16.5 | 18.6 | less than 0.5 | +0.83 | 57 |

The weight-% of the anti-foaming agent is weight-% relative to the total amount of the copolymer.

The weight-% of the anti-foaming agent is weight-% relative to the total amount of the copolymer.

As shown in Table 3, when the powdery dispersant of the present invention is used in mortar grout, mortar grout excellent in flowability, bleeding ratio, expansivity and compression strength is obtained. In particular, when an anti-foaming agent is used, compression strength is stabilized. For use in mortar grout, Ca salts (Nos. 2-1 to 2-4) of copolymers derived from ester type monomers indicate a longer dropping time and more stable separation resistance than those of a Ca salt (No. 2-5) of a copolymer derived from ether type monomers. On the other hand, there is the case where the flowability of No. 2-6 (Comparative Product) is deteriorated due to excessive thickening.

The invented products are excellent in pressure resistance, humidity resistance and pump transportability.

Example 3

Each copolymer shown in Table 4 was used as a dispersant and evaluated in the following manner. The results are shown in Table 5. The $n_M$ and $M_a$ of the dispersant were measured in the following method.

TABLE 4

| | | Copolymer | | | | | | | | | | | | | Production |
|---|---|---|---|---|---|---|---|---|---|---|---|---|---|---|---|
| | | monomer (a) | | | | | | monomer (b) | | Others | | | | Dispersant | |
| | | (a)-1 | | | (a)-2 | | | | | Other-1 | | Other-2 | | | |
| | | Type | Charge molar ratio | n | Type | Charge molar ratio | n | Type | Charge molar ratio | Type | Charge molar ratio | Type | Charge molar ratio | Mw | $M_a$ (mole-%) | $n_M$ | Example |
| Comparative products | 1 | MEPEG | 20 | 10 | — | — | — | MAA | 80 | — | — | — | — | 39000 | 20.5 | 10.4 | 5 |
| | 2 | MEPEG | 35 | 35 | — | — | — | MAA | 65 | — | — | — | — | 42000 | 34.8 | 36.0 | |
| | 3 | MEPEG | 45 | 45 | — | — | — | MAA | 55 | — | — | — | — | 40000 | 45.2 | 45.8 | |
| | 4 | MEPEG | 5 | 75 | — | — | — | MAA | 65 | MSA | 15 | MAc | 15 | 20000 | 5.1 | 74.1 | 7 |
| | 5 | MEPEG | 5 | 75 | MEPEG | 10 | 30 | MAA | 65 | MSA | 15 | MAc | 5 | 19000 | 15.3 | 46.2 | |

TABLE 4-continued

| | | Copolymer | | | | | | | | | | | | | Production Example |
|---|---|---|---|---|---|---|---|---|---|---|---|---|---|---|---|
| | | monomer (a) | | | | | | monomer (b) | | Others | | | | Dispersant | |
| | | (a)-1 | | | (a)-2 | | | | | Other-1 | | Other-2 | | | |
| | | Type | Charge molar ratio | n | Type | Charge molar ratio | n | Type | Charge molar ratio | Type | Charge molar ratio | Type | Charge molar ratio | Mw | $M_a$ (mole-%) | $n_M$ | |
| | 6 | MEPEG | 10 | 75 | MEPEG | 15 | 8 | MAA | 60 | MSA | 10 | MAc | 5 | 22000 | 25.3 | 35.5 | |
| | 7 | MEPEG | 5 | 120 | MEPEG | 20 | 10 | MAA | 75 | — | — | — | — | 35000 | 24.6 | 33.1 | 6 |
| | 8 | MEPEG | 60 | 100 | — | — | — | MAA | 40 | — | — | — | — | 64000 | 61.0 | 101.1 | 5 |
| Invented Products | 1 | MEPEG | 13 | 56 | — | — | — | MAA | 82 | MSA | 5 | — | — | 33000 | 13.2 | 55.4 | 7 |
| | 2 | MEPEG | 13 | 56 | — | — | — | MAA | 87 | — | — | — | — | 32000 | 12.8 | 55.8 | 5 |
| | 3 | MEPEG | 25 | 65 | — | — | — | MAA | 75 | — | — | — | — | 40000 | 24.5 | 64.7 | |
| | 4 | MEPEG | 20 | 75 | — | — | — | MAA | 80 | — | — | — | — | 33000 | 19.2 | 75.6 | |
| | 5 | MEPEG | 20 | 85 | — | — | — | MAA | 80 | — | — | — | — | 56000 | 20.0 | 84.6 | |
| | 6 | MEPEG | 20 | 100 | — | — | — | MAA | 80 | — | — | — | — | 62000 | 20.8 | 99.1 | |
| | 7 | MEPEG | 20 | 115 | — | — | — | MAA | 80 | — | — | — | — | 65000 | 20.2 | 114.6 | |
| | 8 | MEPEG | 20 | 120 | — | — | — | MAA | 80 | — | — | — | — | 66000 | 20.7 | 121.0 | |
| | 9 | MEPEG | 35 | 120 | — | — | — | MAA | 65 | — | — | — | — | 72000 | 34.8 | 119.1 | |
| | 10 | MEPEG | 15 | 130 | — | — | — | MAA | 85 | — | — | — | — | 63000 | 15.2 | 131.2 | |
| | 11 | MEPEG | 15 | 150 | — | — | — | MAA | 85 | — | — | — | — | 81000 | 15.3 | 148.9 | |
| | 12 | MEPEG | 30 | 90 | — | — | — | MAA | 70 | — | — | — | — | 41000 | 31.0 | 91.1 | |
| | 13 | MEPEG | 40 | 80 | — | — | — | MAA | 60 | — | — | — | — | 38000 | 40.3 | 80.5 | |
| | 14 | MEPEG | 45 | 70 | — | — | — | MAA | 55 | — | — | — | — | 42000 | 44.0 | 69.8 | |
| | 15 | MEPEG | 10 | 120 | MEPEG | 15 | 9 | MAA | 75 | — | — | — | — | 68000 | 24.6 | 52.9 | 6 |
| | 16 | MEPEG | 15 | 90 | MEPEG | 15 | 25 | MAA | 60 | — | — | — | — | 64000 | 29.4 | 56.8 | |
| | 17 | MEPEG | 10 | 90 | MEPEG | 15 | 60 | MAA | 75 | — | — | — | — | 61000 | 24.1 | 71.8 | |
| | 18 | METPEG | 35 | 70 | — | — | — | MA | 65 | — | — | — | — | 55000 | 34.0 | 70.6 | 8 |

(Note)
The meanings of the symbols in the table are shown below. Any copolymers in the table are sodium salts having degrees of neutralization of 70 ± 10%.
In Comparative Product 4, the ratio of the monomer (a) + monomer (b) to the total monomers was 87.2% by weight; in Comparative Product 5, the ratio of the monomer (a) + monomer (b) to the total monomers was 93.7% by weight; and in Comparative Product 6, the ratio of the monomer (a) + monomer (b) to the total monomers was 96.2% by weight.
MEPEG: methoxy polyethylene glycol monomethacrylate
METPEG: methoxy polyethylene glycol monoallyl ether
MAA: methacrylic acid
MSA: methallyl sulfonic acid
MAc: methyl acrylate
MA: maleic anhydride
Mw: weight average molecular weight

TABLE 5

| | | Dry powdering | Pressure resistance After 1 day | Pressure resistance After 7 days | Humidity resistance | Pump transportability |
|---|---|---|---|---|---|---|
| Comparative products | 1 | F | — | — | — | — |
| | 2 | F | — | — | — | — |
| | 3 | F | — | — | — | — |
| | 4 | E | E | E | F | A |
| | 5 | E | E | F | F | A |
| | 6 | E | F | F | F | A |
| | 7 | E | F | F | F | A |
| | 8 | C | C | D | A | F |
| Invented products | 1 | E | E | E | E | A |
| | 2 | D | E | F | E | A |
| | 3 | C | C | E | D | A |
| | 4 | C | C | D | D | A |
| | 5 | C | A | C | C | A |
| | 6 | C | A | C | C | A |
| | 7 | C | A | D | C | B |
| | 8 | A | A | D | A | C |
| | 9 | A | A | D | A | C |
| | 10 | A | A | A | B | C |
| | 11 | A | A | A | A | D |
| | 12 | C | A | C | B | A |
| | 13 | C | A | C | A | B |
| | 14 | C | A | C | A | B |
| | 15 | C | C | E | D | A |
| | 16 | C | C | D | C | A |
| | 17 | C | A | C | C | A |
| | 18 | C | A | A | C | A |

As shown in Tables 4 and 5, Comparative Products 1 to 3 of low dispersant $n_M$ are poor in dry powdering; Comparative Product 4 of high $n_M$ but low $M_a$ has an improvement in dry powdering but is poor in humidity resistance; Comparative Products 5 to 7 of low $n_M$ on average, though using monomers of high n, are poor in pressure resistance and humidity resistance; and Comparative Product 8 of high $M_a$ is poor in pump transportability. On the other hand, Invented Products 1 to 18 are excellent in any items of dry powdering, pressure resistance, humidity resistance and pump transportability.

Example 4

The dispersants were prepared in the combinations shown in Table 6 and evaluated in the same manner as in Example 3. The results are shown in Table 6.

TABLE 6

| | Dispersant | | | | $M_a$ (mole-%) | $n_M$ | Dry powdering | Pressure resistance After 1 day | Pressure resistance After 7 days | Humidity resitance | Pump transportability |
|---|---|---|---|---|---|---|---|---|---|---|---|
| | Coplymer | Weight-% | Coplymer | Weight-% | | | | | | | |
| Comparative product | Comparative product 1 | 100 | — | — | 20.0 | 10.0 | F | — | — | — | — |
| | Comparative product 3 | 100 | — | — | 45.0 | 45.0 | F | — | — | — | — |
| Invented products | Comparative product 1 | 50 | Invented product 7 | 50 | 20.0 | 62.5 | C | E | E | E | A |
| | Comparative product 3 | 45 | Invented product 4 | 55 | 31.3 | 75.3 | C | C | C | C | A |

Example 5

100 parts by weight of rapid-hardening Portland cement (Taiheiyo Cement Corp.), 100 parts by weight of fine aggregate [siliceous sand (a mixture of Nos. 3, 4 and 5, manufactured by Takeori Kogyo-sho)], 0.0025 part by weight of a thickener [Metrose (Shin-Etsu Chemical Co., Ltd.)), 0.02 part by weight of a retarder [sodium citrate (special grade)], 5 parts by weight of an expansive material [Denka CSA (Denki Kagaku Kogyo)J, 0.0015 part by weight of a foaming agent (metal aluminum powder), the powdery dispersant in Table 8 and an anti-foaming agent [Foamlex 797 (Nicca Chemical Co., Ltd.)] in an amount shown in Table 7 were mixed to produce a grout material. Water was added to the grout material, and the mixture was kneaded for 3 minutes with a hand mixer to give slurry. This slurry was used in the following evaluation. The results are shown in Table 7.

compression strength is obtained. In particular, when an anti-foaming agent is used, compression strength is stabilized. For use in mortar grout, Na salts (Nos. 3-1 to 3-4) of copolymers derived from ester type monomers indicate a longer dropping time and more stable separation resistance than those of a Na salt (No. 3-5) of a copolymer derived from ether type monomers. On the other hand, there is the case where the flowability of No. 3-6 (Comparative Product) is deteriorated due to excessive thickening.

What is claimed is:

1. A method of dispersing a hydraulic composition, said method comprising adding a powdery dispersant to the hydraulic composition;
    wherein said powdery dispersant comprises at least one copolymer as a powder, wherein said copolymer is made by polymerizing at least one vinyl monomer (a) represented by the formula (1):

TABLE 7

| | Powdery dipersant | | | | Anti-foaming agent (weight-%) | $M_a$ (モル%) | $n_M$ | Dropping time (sec) Just after kneading | After 30 minutes | After 60 minutes | After 90 minutes | Bleeding ratio | Expansivity (%) | Compression Strength (N/mm²) |
|---|---|---|---|---|---|---|---|---|---|---|---|---|---|---|
| No. | Co-polymer | weight-% | Co-polymer | weight-% | | | | | | | | | | |
| 3-1 | Invented product 5 | 100 | — | — | 0.3 | 20.0 | 84.6 | 5.6 | 8.1 | 10.6 | 13.8 | less than 0.5 | +0.82 | 57 |
| 3-2 | Invented product 5 | 100 | — | — | — | 20.0 | 84.6 | 5.8 | 8.3 | 11.0 | 13.9 | less than 0.5 | +0.83 | 51 |
| 3-3 | Invented product 10 | 30 | Invented product 2 | 70 | 0.3 | 14.2 | 77.3 | 5.8 | 7.8 | 10.2 | 13.2 | less than 0.5 | +0.85 | 56 |
| 3-4 | Invented product 15 | 100 | — | — | 0.3 | 24.6 | 52.9 | 5.5 | 7.5 | 10.0 | 12.9 | less than 0.5 | +0.88 | 55 |
| 3-5 | Invented product 18 | 100 | — | — | 0.3 | 34.0 | 70.6 | 5.2 | 7.0 | 9.6 | 11.5 | less than 0.5 | +0.89 | 53 |
| 3-6 | Comparative product | 100 | — | — | 0.3 | 61.0 | 101.0 | 7.2 | 10.8 | 17.0 | 18.8 | less than 0.5 | +0.81 | 51 |

The weight-% of the anti-foaming agent is weight-% relative to the total amount of the copolymer.

As shown in Table 7, when the powdery dispersant of the present invention is used in mortar grout, mortar grout excellent in flowability, bleeding ratio, expansivity and

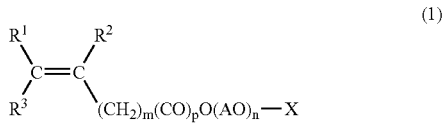

(1)

wherein $R^1$ and $R^2$ represent a hydrogen atom or a methyl group, $R^3$ represents a hydrogen atom or —COO(AO)$_n$X, m is a number of 0 to 2, p is a number of 0 or 1, AO represents a $C_{2-4}$ oxyalkylene group or an oxystyrene group, n is the average mole number of AO groups and is a number of 2 to 300, and X represents a hydrogen atom or a $C_{1-18}$ alkyl group;

with at least one vinyl monomer (b) represented by the formula (2):

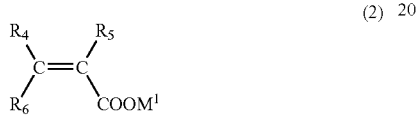

(2)

wherein $R^4$, $R^5$ and $R^6$ are the same as or different from one another and each represent a hydrogen atom, a methyl group or —(CH$_2$)$_{m1}$COOM$^2$ wherein —(CH$_2$)$_{m1}$COOM$^2$ is optionally combined with —COOM or another —(CH$_2$)$_{m1}$COOM$^2$ to produce an anhydride so that $M^1$ and $M^2$ of these groups are not present, each of $M^1$ and $M^2$ represents a hydrogen atom or a monovalent metal, and $m_1$ is a number of 0 to 2, wherein the average mole number of $C_{2-4}$ oxyalkylene groups or oxystyrene groups of said copolymer is 50 to 150;

(a)/[(a)+(b)]×100 ranges from 15 to 45 (mole %);

at least part of the copolymer is a monovalent metal salt; and a degree of neutralization of 50% to 90%.

2. The method of claim 1, wherein the average mole number of $C_{2-4}$ oxyalkylene groups or oxystyrene groups of said copolymer is 70 to 115.

3. The method of claim 1, wherein (a)/[(a)+(b)]×100 ranges from 20 to 45 mole %.

4. The method of claim 1, wherein the powdery dispersant comprises the copolymer made from starting monomers that are 98 to 100% by weight of the monomers (a) and (b).

5. The method of claim 1, wherein said powdery dispersant comprises 50 to 100% by weight of dispersant particles whose diameter is 500 µm or less.

6. The method of claim 1, wherein the average mole number of the $C_{2-4}$ oxyalkylene groups or oxystyrene groups of said copolymer is 70 to 100.

7. The method of claim 1, wherein said at least one vinyl monomer (b) is selected from the group consisting of (meth)acrylic acid, a salt thereof and maleic anhydride.

8. The method of claim 1, wherein said monovalent metal salt is an alkali metal salt.

9. The method of claim 8, wherein said monovalent metal salt is sodium.

10. A method of mixing a powdery dispersant for a hydraulic composition, said method comprising mixing the powdery dispersant with the hydraulic composition, wherein said powdery dispersant comprises at least one copolymer, wherein said copolymer is made by polymerizing at least one vinyl monomer (a) represented by the formula (1):

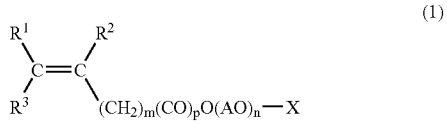

(1)

wherein $R^1$ and $R^2$ represent a hydrogen atom or a methyl group, $R^3$ represents a hydrogen atom or —COO(AO)$_n$X, m is a number of 0 to 2, p is a number of 0 or 1, AO represents a $C_{2-4}$ oxyalkylene group or an oxystyrene group, n is the average mole number of AO groups and is a number of 2 to 300, and X represents a hydrogen atom or a $C_{1-18}$ alkyl group;

with at least one vinyl monomer (b) selected from the group consisting of acrylic acid, methacrylic acid, an alkaline earth metal salt of acrylic acid, an alkaline earth metal salt of methacrylic acid and maleic anhydride;

wherein the average mole number of $C_{2-4}$ oxyalkylene groups or oxystyrene groups of said copolymer is 50 to 150;

(a)/[(a)+(b)]×100 ranges from 15 to 45 (mole %); and at least part of the copolymer is an alkali metal salt; and a degree of an alkali metal salt; and a degree of neutralization of 50% to 90%.

11. A method of dispersing mortar with a powdery dispersant for a hydraulic composition, said method comprising dispersing said mortar with the powdery dispersant for the hydraulic composition, said powdery dispersant comprising at least one copolymer, wherein said copolymer is made by polymerizing at least one vinyl monomer (a) represented by the formula (1):

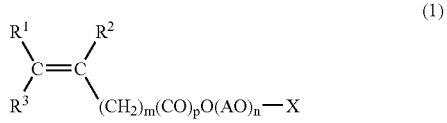

(1)

wherein $R^1$ and $R^2$ represent a hydrogen atom or a methyl group, $R^3$ represents a hydrogen atom or —COO(AO)$_n$X, m is a number of 0 to 2, p is a number of 0 or 1, AO represents a $C_{2-4}$ oxyalkylene group or an oxystyrene group, n is the average mole number of AO groups and is a number of 2 to 300, and X represents a hydrogen atom or a $C_{1-18}$ alkyl group;

with at least one vinyl monomer (b) selected from the group consisting of acrylic acid, methacrylic acid, an alkaline earth metal salt of acrylic acid, an alkaline earth metal salt of methacrylic acid and maleic anhydride;

wherein the average mole number of $C_{2-4}$ oxyalkylene groups or oxystyrene groups of said copolymer is 50 to 150;

(a)/[(a)+(b)]×100 ranges from 15 to 45 (mole %); and at least part of the copolymer is an alkali metal salt; and a degree of neutralization of 50% to 90%. metal salt.

12. The method according to claim 1, wherein after making the copolymer by polymerization, the copolymer is subjected to a step of powdering to give the copolymer powder.

13. The method according to claim 12, wherein the powdering step is carried out without any carrier.

14. The method according to claim 12, wherein the powdering step is carried out by a spray drying method or a film drying method.

* * * * *